(12) United States Patent
Boorse et al.

(10) Patent No.: US 9,657,625 B2
(45) Date of Patent: May 23, 2017

(54) WALL FLOW FILTER LOADED WITH SCR CATALYST, SYSTEMS AND METHODS OF EXHAUST GAS TREATMENT

(75) Inventors: R. Samuel Boorse, Skillman, NJ (US); Martin Dieterle, Jersey City, NJ (US)

(73) Assignee: BASF Corporation, Florham Park, NJ (US)

( * ) Notice: Subject to any disclaimer, the term of this patent is extended or adjusted under 35 U.S.C. 154(b) by 1602 days.

(21) Appl. No.: 12/943,109

(22) Filed: Nov. 10, 2010

(65) Prior Publication Data

US 2011/0113761 A1    May 19, 2011

Related U.S. Application Data

(60) Provisional application No. 61/261,000, filed on Nov. 13, 2009.

(51) Int. Cl.

| | |
|---|---|
| *F01N 3/00* | (2006.01) |
| *F01N 3/20* | (2006.01) |
| *F01N 3/022* | (2006.01) |
| *F01N 3/035* | (2006.01) |
| *F01N 3/10* | (2006.01) |
| *F01N 13/00* | (2010.01) |

(52) U.S. Cl.
CPC ......... *F01N 3/2066* (2013.01); *F01N 3/0222* (2013.01); *F01N 3/035* (2013.01); *F01N 3/103* (2013.01); *F01N 13/009* (2014.06); *F01N 13/0093* (2014.06); *F01N 2250/02* (2013.01); *F01N 2330/06* (2013.01); *F01N 2370/04* (2013.01); *F01N 2510/063* (2013.01); *F01N 2510/0682* (2013.01); *F01N 2610/02* (2013.01); *Y02T 10/24* (2013.01)

(58) Field of Classification Search
USPC ........ 60/311, 297, 299, 286; 422/211, 239.1
See application file for complete search history.

(56) References Cited

U.S. PATENT DOCUMENTS

| | | | | |
|---|---|---|---|---|
| 4,329,162 | A | * | 5/1982 | Pitcher, Jr. ................. 55/523 |
| 4,390,355 | A | * | 6/1983 | Hammond et al. ............ 55/523 |
| 4,857,089 | A | * | 8/1989 | Kitagawa et al. ............. 55/523 |
| 4,963,332 | A | | 10/1990 | Brand et al. |
| 5,100,632 | A | | 3/1992 | Dettling et al. |
| 5,462,907 | A | | 10/1995 | Farrauto et al. |
| 5,491,120 | A | | 2/1996 | Voss et al. |
| 5,522,218 | A | | 6/1996 | Lane et al. |
| 6,415,602 | B1 | | 7/2002 | Patchett et al. |
| 6,753,294 | B1 | * | 6/2004 | Brisley et al. ............... 502/439 |

(Continued)

FOREIGN PATENT DOCUMENTS

EP    0766993    4/1997

*Primary Examiner* — Kenneth Bomberg
*Assistant Examiner* — Anthony Ayala Delgado
(74) *Attorney, Agent, or Firm* — Womble Carlyle Sandridge & Rice LLP (57) ABSTRACT

Provided are selective catalytic reduction catalytic articles, emission treatment systems and methods for simultaneously remediating the nitrogen oxides ($NO_x$), particulate matter, and gaseous hydrocarbons present in diesel engine exhaust streams. The catalytic articles have a Selective Catalytic Reduction (SCR) catalyst uniformly coated over the outlet portion of wall flow filter walls resulting in reduction of $NO_2$ and combustion of the soot without substantially increasing the system backpressure.

15 Claims, 4 Drawing Sheets

(56) References Cited

U.S. PATENT DOCUMENTS

| | | | |
|---|---|---|---|
| 7,062,904 B1* | 6/2006 | Hu et al. | 60/286 |
| 7,097,817 B2* | 8/2006 | Brisley et al. | 423/245.3 |
| 7,229,597 B2 | 6/2007 | Patchett et al. | |
| 2003/0044572 A1* | 3/2003 | Beall et al. | 428/116 |
| 2003/0115859 A1* | 6/2003 | Deeba | 60/297 |
| 2006/0179825 A1* | 8/2006 | Hu et al. | 60/297 |
| 2007/0110650 A1 | 5/2007 | Pfeifer et al. | |
| 2007/0140928 A1 | 6/2007 | Beall et al. | |
| 2008/0044319 A1 | 2/2008 | Takahashi et al. | |
| 2010/0303677 A1* | 12/2010 | Henry et al. | 422/171 |

\* cited by examiner

WALL FLOW FILTER LOADED WITH SCR CATALYST, SYSTEMS AND METHODS OF EXHAUST GAS TREATMENT

CROSS-REFERENCE TO RELATED APPLICATIONS

This application claims the benefit of priority under 35 U.S.C. §119(e) to U.S. Provisional Application Ser. No. 61/261,000, filed Nov. 13, 2009 the disclosure of which is hereby incorporated herein by reference thereto.

TECHNICAL FIELD

The present invention relates to catalytic articles comprising a wall flow filter loaded with SCR catalyst, emission treatment systems including such articles and having an oxidation catalyst upstream of the catalytic article. In one embodiment, the system provides an effective method of simultaneously remediating the nitrogen oxides ($NO_x$), particulate matter, and gaseous hydrocarbons present in diesel engine exhaust streams.

BACKGROUND

Diesel engine exhaust is a heterogeneous mixture which contains not only gaseous emissions such as carbon monoxide (CO), unburned hydrocarbons ("HC") and nitrogen oxides ("$NO_x$"), but also condensed phase materials (liquids and solids) which constitute the so-called particulates or particulate matter. Often, catalyst compositions and substrates on which the compositions are disposed are provided in diesel engine exhaust systems to convert certain or all of these exhaust components to innocuous components. For example, diesel exhaust systems can contain one or more of a diesel oxidation catalyst, a soot filter and a catalyst for the reduction of $NO_x$.

Oxidation catalysts that contain platinum group metals, base metals and combinations thereof are known to facilitate the treatment of diesel engine exhaust by promoting the conversion of both HC and CO gaseous pollutants and some proportion of the particulate matter through oxidation of these pollutants to carbon dioxide and water. Such catalysts have generally been contained in units called diesel oxidation catalysts ("DOC"), which are placed in the exhaust of diesel engines to treat the exhaust before it vents to the atmosphere. In addition to the conversions of gaseous HC, CO and particulate matter, oxidation catalysts that contain platinum group metals (which are typically dispersed on a refractory oxide support) promote the oxidation of nitric oxide (NO) to $NO_2$.

The total particulate matter emissions of diesel exhaust are comprised of three main components. One component is the solid, dry, solid carbonaceous fraction or soot fraction. This dry carbonaceous matter contributes to the visible soot emissions commonly associated with diesel exhaust. A second component of the particulate matter is the soluble organic fraction ("SOF"). The soluble organic fraction is sometimes referred to as the volatile organic fraction ("VOF"), which terminology will be used herein. The VOF can exist in diesel exhaust either as a vapor or as an aerosol (fine droplets of liquid condensate) depending on the temperature of the diesel exhaust. It is generally present as condensed liquids at the standard particulate collection temperature of 52° C. in diluted exhaust, as prescribed by a standard measurement test, such as the U.S. Heavy Duty Transient Federal Test Procedure. These liquids arise from two sources: (1) lubricating oil swept from the cylinder walls of the engine each time the pistons go up and down; and (2) unburned or partially burned diesel fuel.

The third component of the particulate matter is the so-called sulfate fraction. The sulfate fraction is formed from small quantities of sulfur components present in the diesel fuel. Small proportions of $SO_3$ are formed during combustion of the diesel, which in turn combines rapidly with water in the exhaust to form sulfuric acid. The sulfuric acid collects as a condensed phase with the particulates as an aerosol, or is adsorbed onto the other particulate components, and thereby adds to the mass of the total particulate matter.

One aftertreatment technology in use for high particulate matter reduction is the diesel particulate filter. There are many known filter structures that are effective in removing particulate matter from diesel exhaust, such as honeycomb wall flow filters, wound or packed fiber filters, open cell foams, sintered metal filters, etc. However, ceramic wall flow filters, described below, receive the most attention. These filters are capable of removing over 90% of the particulate material from diesel exhaust. The filter is a physical structure for removing particles from exhaust, and the accumulating particles will increase the back pressure from the filter on the engine. Thus the accumulating particles have to be continuously or periodically burned out of the filter to maintain an acceptable back pressure.

Ammonia selective catalytic reduction (SCR) is a $NO_x$ abatement technology that will be used to meet strict $NO_x$ emission targets in diesel and lean-burn engines. In the ammonia SCR process, $NO_x$ (defined as the sum of $NO+NO_2$) is reacted with ammonia (or an ammonia precursor such as urea) to form dinitrogen ($N_2$) over a catalyst typically composed of base metals.

Catalyzed wall flow filters containing a catalyst that promotes SCR of $NO_x$ assume two functions: removal of the particulate component of the exhaust stream and conversion of the $NO_x$ component of the exhaust stream to $N_2$. SCR-coated wall flow filters that can achieve $NO_x$ reduction goals require a sufficient loading of SCR catalyst composition on the wall flow filter under the usual space constraints in a vehicle. The gradual loss of the catalytic effectiveness of the compositions that occurs over lifetime through exposure to certain deleterious components of the exhaust stream or high temperatures augments the need for higher catalyst loadings of the SCR catalyst composition. However, preparation of coated wall flow filters with higher catalyst loadings can lead to unacceptably high back pressure within the exhaust system. An increase in backpressure can have an adverse impact on fuel efficiency.

An additional aspect for consideration in coating the wall flow filter is the selection of the appropriate SCR catalyst composition. First, the catalyst composition must be thermally durable so that it maintains its SCR catalytic activity even after prolonged exposure to higher temperatures that are characteristic of filter regeneration. For example, combustion of the soot fraction of the particulate matter often leads to temperatures above 700° C. and higher. Such temperatures render many commonly used SCR catalyst compositions such as mixed oxides of vanadium and titanium less catalytically effective. Second, the SCR catalyst compositions preferably have a wide enough operating temperature range so that they can accommodate the variable temperature ranges over which the vehicle operates. Temperatures below 300° C. are typically encountered, for example, at conditions of low load, or at startup. The SCR catalyst compositions are preferably capable of catalyzing the reduction of the $NO_x$ component of the exhaust to achieve $NO_x$ reduction goals, even at lower exhaust temperatures, particularly when the SCR catalyst is disposed on a filter substrate such as a wall flow filter. In general the SCR catalyst should have a high specific activity combined with a high hydrothermally stability.

Wall flow filters containing SCR catalysts and coating techniques have been proposed that allow higher SCR catalyst loadings on the wall flow filter, yet still allow the filter to maintain flow characteristics that achieve acceptable back pressures. Despite such proposed wall flow filters and coating techniques having higher SCR catalyst loadings, it would be desirable to provide alternative catalyzed filters and systems that permit management of backpressure and the catalytic function of the SCR catalyst. In addition, it would be desirable to provide catalytic articles, systems and methods that utilize particulate filters coated with an SCR catalyst at a loading that also achieves sufficient lower temperature $NO_x$ conversion when the exhaust gas stream passes through the filter, as well as exhibiting desirable hydrothermal aging characteristics.

SUMMARY OF THE INVENTION

One or more embodiments of the invention are directed to catalytic articles comprising a wall flow filter having a plurality of longitudinally extending passages formed by longitudinally extending porous walls having substantially uniform porosity in cross-section bounding and defining the passages wherein the passages comprise inlet passages having an open inlet end and a closed outlet end, and outlet passages having a closed inlet end and an open outlet end, each of the porous walls having in cross-section an inlet portion and an outlet portion, the outlet portion being no greater than about 60% of the cross-sectional thickness of the porous walls, and an SCR catalyst composition disposed on the wall flow filter such that substantially all of the catalyst is distributed in the outlet portion of the porous walls.

In detailed embodiments, the SCR catalyst uniformly permeates the porous walls. In specific embodiments, the inlet portion of the wall is substantially free of SCR catalyst composition.

In various embodiments, the catalytic article is effective to prevent reaction of $NO_2$ with catalyst in the inlet portion of the wall and to allow soot trapped in the inlet portion to react with $NO_2$ and to combust. In some embodiments, the catalytic article is effective to form a soot cake on the inlet surface of the porous walls. In detailed embodiments, the mean pore size of the wall flow filter is effective to allow build-up of soot on the inlet side of the filter wall.

Additional embodiments of the invention are directed to methods of treating an exhaust gas stream including $NO_x$ and soot comprising passing the exhaust gas stream through the catalyst. In specific embodiments, the exhaust gas entering the catalyst has a $NO_2$ percentage greater than about 50%.

Further embodiments of the invention are directed to systems for treating exhaust from a diesel engine comprising the catalytic article located downstream of the engine. In detailed embodiments, the system further comprises a urea injector located upstream of the catalyst. In some specific embodiments, one or more of a diesel oxidation catalyst, a particulate filter, a reductant injector and an air injector are included in the system.

DETAILED DESCRIPTION OF THE INVENTION

Embodiments of the invention relate to a catalytic article including a selective catalytic reduction catalyst and an emission treatment system that effectively provides simultaneous treatment of the particulate matter, the $NO_x$ and other gaseous components of diesel engine exhaust. The emission treatment system uses an integrated soot filter and SCR catalyst to significantly minimize the weight and volume required for the emissions system. Moreover, due to the choice of catalytic compositions implemented in the system, effective pollutant abatement is provided for exhaust streams of varying temperatures. This feature is advantageous for operating diesel vehicles under varying loads and vehicle speeds which significantly impact exhaust temperatures emitted from the engines of such vehicles.

Without being bound by a particular theory of operation, it is believed that removal of soot on a filter wall partially results from $NO_2$ molecules that can diffuse against the gas flow across the wall and interact with the soot layer more than once, thereby increasing the chance of reaction between the soot and the back-diffusing $NO_2$. The removal of $NO_2$ by reaction with the SCR catalyst in the wall largely removes this "multiple pass" mechanism, and the $NO_2$ soot reaction is reduced to a single chance of interaction with the soot layer as the $NO_2$ passes through the first time. This in turn leaves more soot in the wall and in the cake, causing higher backpressure. To decrease the backpressure of the soot-loaded SCRF component, two elements are desired: (1) operation at higher than 50% $NO_2/NO_x$ concentration ratio to the inlet of the SCRF; and (2) coating the filter wall with SCR catalyst in such a way as to not have any catalyst on the inlet half of the wall cross-section and only coating the outlet half of the wall cross-section. It will be appreciated that with a soot free filter, a $NO_2/NO_x$ ratio above 50% could have a detrimental effect on SCR activity and with some SCR catalysts. It is anticipated that a filter in a soot-free condition exists during a small percentage of the operation of system. It will be appreciated that the $NO2/NO_x$ ratio is an average ratio over multiple engine operating modes.

In order to avoid very high back pressures, the SCR catalyst coating should not simply be on the outlet channel wall surface where it would form a fully dense layer. Rather the coating must be in the wall but only penetrate the outlet half of the wall. Such a coating would allow $NO_2$ which passed through the soot layer without reacting to react with soot that had penetrated the wall without having to compete with the SCR reaction, thereby raising the likelihood of soot removal. The raising of the $NO_2/NO_x$ ratio would also increase the likelihood of $NO_2$ reaction with soot prior to consumption by the SCR reaction simply by increasing the $NO_2$ concentration at the soot cake/wall soot locations.

The following terms shall have, for the purposes of this application, the respective meanings set forth below.

"Platinum group metal components" refer to platinum group metals or one of their oxides. "Washcoat" has its usual meaning in the art of a thin, adherent coating of a catalytic or other material applied to a refractory substrate, such as a honeycomb flow through monolith substrate or a filter substrate, which is sufficiently porous to permit the passage there through of the gas stream being treated.

"Flow communication" means that the components and/or conduits are adjoined such that exhaust gases or other fluids can flow between the components and/or conduits.

"Downstream" refers to a position of a component in an exhaust gas stream in a path further away from the engine than the component preceding component. For example, when a diesel particulate filter is referred to as downstream from a diesel oxidation catalyst, exhaust gas emanating from the engine in an exhaust conduit flows through the diesel oxidation catalyst before flowing through the diesel particulate filter. Thus, "upstream" refers to a component that is located closer to the engine relate to another component.

Reference to "substantially all" refers to greater than about 95% by weight. In more specific embodiments, "substantially all" refers to greater than about 99% by weight. In other words, when substantially all of the SCR catalyst is in the outlet portion of the walls, no SCR catalyst is intentionally distributed within the inlet portion of the walls.

Reference to "substantially uniform porosity in cross-section" refers to porosity that is similar in pore size and distribution throughout the cross-section of the wall. For example, substantially uniform porosity in cross-section would not include a wall structure in which the pore size through the wall cross-section is intentionally varied, for example, where the pores are larger adjacent the inlet surface compared to the pores adjacent the outlet surface.

Integration of $NO_x$ reduction and particulate removal functions into a single catalytic article is accomplished using a wall flow substrate coated with an SCR catalyst composition. Applicants have found a method for applying an SCR catalyst composition to a wall flow substrate to form a substrate that can be used in an application where high filtration efficiency is required. For instance, a substrate formed with this method is suitable for effectively removing particulate matter (e.g., greater than 80%) in the emission treatment system of the invention. Embodiments of the invention allow wall flow substrates to be loaded with practical levels of SCR catalyst without causing excessive back pressure across the coated article when implemented in emission treatment systems.

Achieving practical levels of SCR catalyst composition on the wall flow substrate aids in providing sufficient catalytic activity to achieve mandated $NO_x$ reduction levels, and for lowering the combustion temperature of the soot fraction trapped on the filter. Achieving adequate levels of SCR washcoat compositions on the soot filter is also important to secure adequate durability for the catalyst. Over extended use of the emission treatment system, catalysts are invariably exposed to various levels of catalyst poisons that may be derived through break down of lubricating oils, or may arise from impurities in the diesel fuel. Examples of such catalyst poisons include phosphorus, zinc, alkali and alkaline earth elements. Higher levels of catalyst compositions are therefore typically deposited on catalyst substrates to overcome the inevitable loss of catalytic activity.

Figure 1:
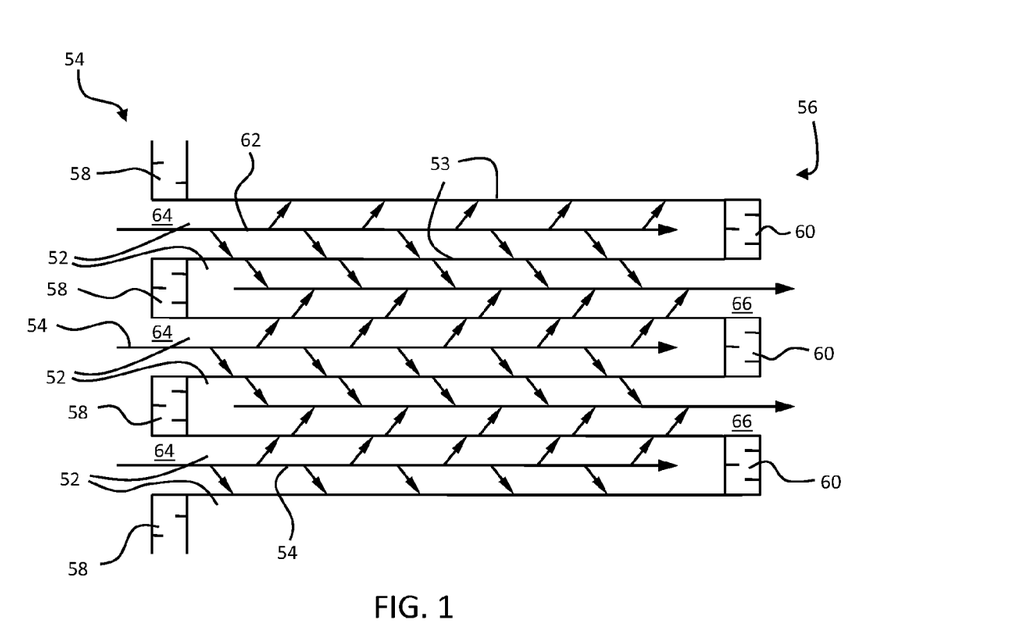
FIG. 1 shows a cutaway view of a section of a wall flow filter substrate.
Figure 2:
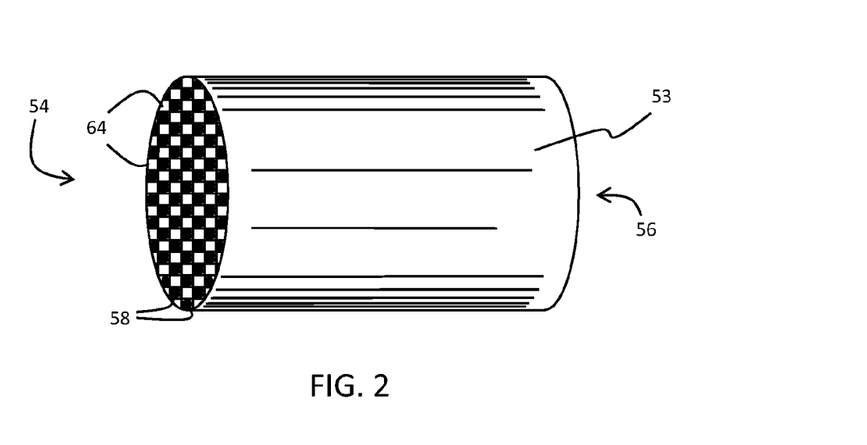
FIG. 2 shows a perspective view of a wall flow filter substrate.

One or more embodiments of the invention are directed to catalytic articles comprising a wall flow filter having an SCR catalyst. FIGS. 1 and 2 illustrate a wall flow filter monolith 30 which has a plurality of passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58.

Figure 3:
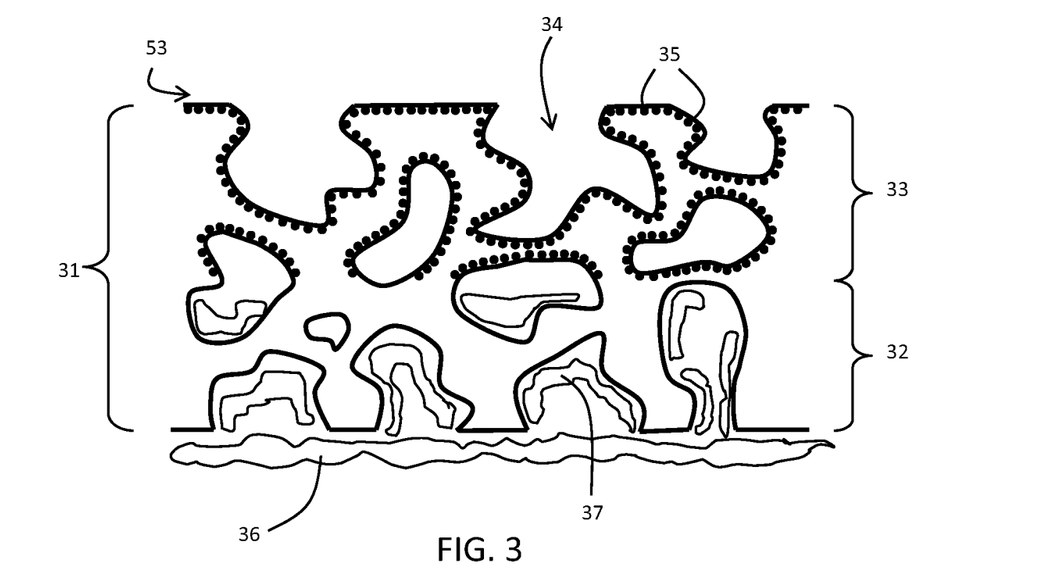
FIG. 3 shows a cutaway view of a section of a porous wall of a wall flow filter substrate.

FIG. 3 shows an expanded view of a porous channel wall 53 having a plurality of pores 34 therethrough. Each of the porous walls 53 having in cross-section 31 an inlet portion 32 and an outlet portion 33, the outlet portion 33 being no greater than about 60% of the cross-sectional thickness 31 of the porous walls 53. The outlet portion 33 representing the remainder of the cross-sectional thickness 31 of the porous walls 53. An SCR catalyst composition 35 disposed on the wall flow filter such that substantially all of the catalyst 35 is distributed in the outlet portion 33 of the porous walls 53.

The catalytic article can collect a soot cake 36 on the inlet side of the porous wall 53 and can also allow some fraction of the soot 37 to penetrate the inlet portion 32 of the porous walls 53. When passing through the porous walls 53, $NO_2$ can react with the soot cake 36 on the surface of the inlet side of the wall 53 resulting in conversion to NO and combustion of some of the soot cake 36. The $NO_2$ which passes through the soot cake 36 can react with the soot 37 in the inlet portion 32 of the wall 53, also resulting in conversion to NO and combustion of some of the soot 37. The NO and the $NO_2$ which pass into the outlet portion 33 of the porous walls 53 can react with the SCR catalyst 35, resulting in reduction to $N_2$. If the SCR catalyst 35 and soot 37 are in close proximity, the $NO_2$ will be preferentially consumed by the SCR over the soot 37. This would cause the $NO_2$ to be reduced to $N_2$ but no soot removal would occur. If the soot continues to build without being removed by reaction with $NO_2$, the backpressure in the system will increase, potentially resulting in mechanical failure. Accordingly, in specific embodiments, the catalytic article is effective to prevent reaction of $NO_2$ with catalyst in the inlet portion of the wall and to allow soot trapped in the inlet portion to react with $NO_2$ and to combust the soot.

In detailed embodiments, the wall flow filter has a substantially uniform mean pore size. In specific embodiments, the wall flow filter has a mean pore size in the range of about 3 μm and about 35 μm. In other detailed embodiments, the mean pore size is in the range of about 5 μm and about 30 μm, or in the range of about 10 μm to about 25 μm. In some detailed embodiments, the mean pore size is greater than about 1 μm, 2 μm, 3 μm, 4 μm, 5 μm, 6 μm, 7 μm, 8 μm, 9 μm, 10 μm, 11 μm, 12 μm, 13 μm, 14 μm or 15 μm. In some detailed embodiments, the mean pore size is less than about 40 μm, 39 μm, 38 μm, 37 μm, 36 μm, 35 μm, 34 μm, 33 μm, 32 μm, 31 μm, 30 μm, 29 μm, 28 μm, 27 μm, 26 μm or 25 μm. In specific embodiments, the mean pore size is effective to allow build-up of soot on the inlet side of the filter wall. In some specific embodiments, the mean pore size is effective to allow some soot to enter the pores on the inlet surface of the porous walls.

The size of the outlet portion of the porous wall can be adjusted according to various embodiments. In specific individual embodiments, the outlet portion of the porous wall is no greater than about 60%, 55%, 50%, 45%, 40%, 35% or 30% of the cross-section of the porous walls.

Additional embodiments of the invention are directed to methods of treating an exhaust gas stream including $NO_x$ and soot. The method comprises passing the exhaust gas stream through a catalytic article comprising a wall flow filter. The wall flow filter having a plurality of longitudinally extending passages formed by longitudinally extending porous walls having substantially uniform porosity in cross-section bounding and defining the passages wherein the passages comprise inlet passages having an open inlet end and a closed outlet end. The outlet passages have a closed inlet end and an open outlet end. Each of the porous walls has, in cross-section, an inlet portion and an outlet portion, with the outlet portion being no greater than about 60% of the cross-sectional thickness of the porous walls. An SCR catalyst composition is disposed on the wall flow filter such that substantially all of the catalyst is distributed in the outlet portion of the porous walls.

In specific embodiments, the exhaust gas entering the catalyst has a $NO_2$ percentage greater than about 50% of the total $NO_x$ composition.

Figure 4A:
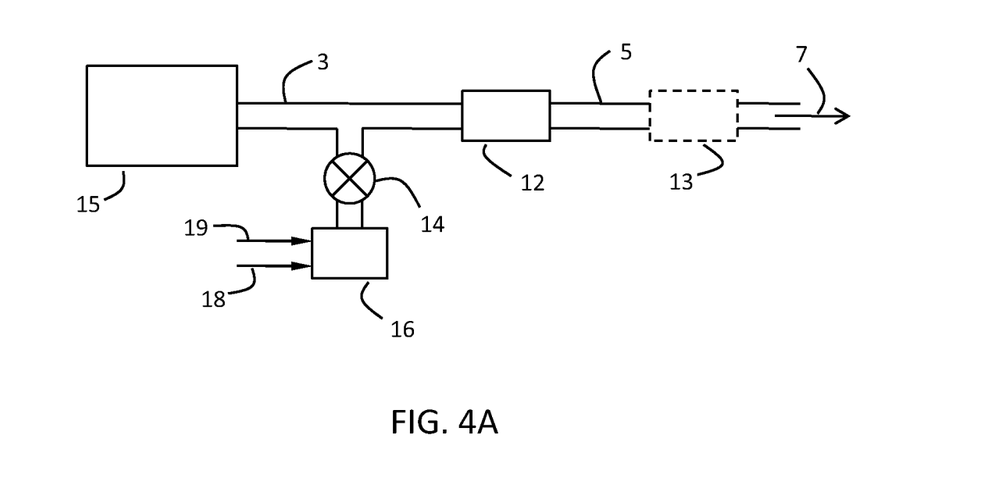
FIGS. 4A and 4B show schematic depictions of two embodiments of an emission treatment system according to one or more embodiments of the invention.

Further embodiments of the invention are directed to systems for treating exhaust from a diesel engine. The systems comprise the catalytic article previously described located downstream of an engine. One embodiment of the inventive emission treatment system is schematically depicted in FIG. 4A. As seen, the exhaust gas stream containing gaseous pollutants (including unburned hydrocarbons, carbon monoxide and $NO_x$) and particulate matter from the engine 15 is introduced into the system. A reductant such as hydrocarbons, ammonia or any ammonia precursor (e.g., urea) or any other material showing a sufficient high reduction potential to facilitate the SCR reaction may optionally be injected as a spray via a nozzle (not shown) into the exhaust stream. Aqueous urea shown on one line 18 can serve as an ammonia precursor which can be mixed with air on another line 19 in a mixing station 16. Valve 14 can be used to meter precise amounts of aqueous urea which are converted in the exhaust stream to ammonia. The exhaust stream with the added reductant is conveyed to the particulate filter 12 containing a first SCR catalyst, as previously described. On passing through the particulate filter 12, the $NO_x$ component is converted through the selective catalytic reduction of $NO_x$ with ammonia to nitrogen. There is no intervening SCR catalyst disposed between the engine 15 and the particulate filter 12.

Some of the particulate matter including the soot fraction and the VOF are also removed by the particulate filter 12. The particulate matter deposited on the particulate filter 12 is combusted through the regeneration of the filter, which is also aided by the presence of the SCR catalyst. The temperature at which the soot fraction of the particulate matter combusts is lowered by the presence of the catalyst composition disposed on the particulate filter 12.

Upon exiting the particulate filter 12, the gas stream may pass through an optional substrate 13 containing a second SCR catalyst. The substrate 13 may be a flow through substrate and is disposed downstream of the particulate filter 12. The gas stream exiting the engine 15 contains an initial $NO_x$ concentration at location 3 before entering the particulate filter 12, an intermediate $NO_x$ concentration at location 5 between the particulate filter 12 and the downstream substrate 13, and a final $NO_x$ concentration at location 7 after passing through the flow through substrate 13. System conversion of $NO_x$ attained in the gas stream based on the initial $NO_x$ concentration and the final $NO_x$ concentration is greater than about 50%. The $NO_x$ conversion by the particulate filter 12 is in the range of about 10% to about 90% of the system $NO_x$ conversion integrally measured over a test driving cycle (see http://www.epa.gov/nvfel/testing/dynamometer.htm for a description of test driving cycles) or under simulated reactor conditions By traveling through the emissions treatment system herein described, the gas stream causes minimal increase in the back pressure of the system.

Depending on the desired level of $NO_x$ removal, additional SCR catalyst can be disposed downstream of the particulate filter 12. For example, the additional SCR catalyst may be disposed on a monolithic, honeycomb flow through substrate or ceramic foam substrate downstream of the soot filter. Even in these embodiments, the use of the coated SCR soot filter still achieves a reduction in the total volume of catalyst required to meet $NO_x$ reduction goals.

Figure 4B:
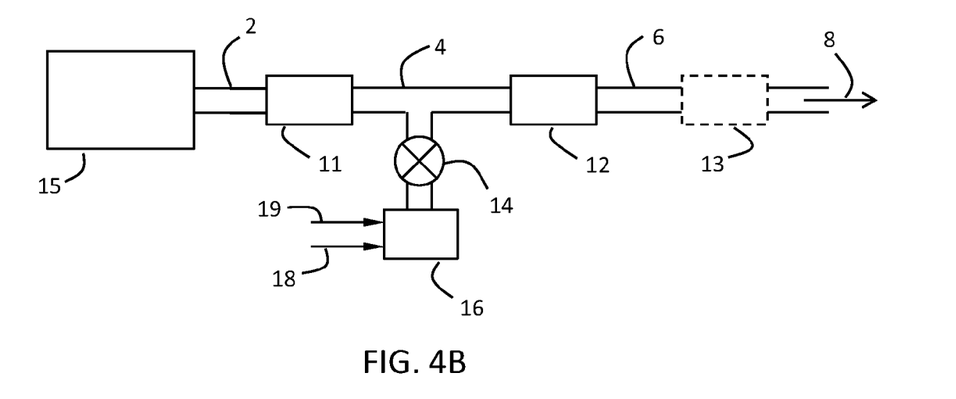

FIG. 4B illustrates an exemplary emission treatment system according to one or more embodiments of the invention. Here, an oxidation catalyst 11 is located downstream of the engine 15 and upstream of the particulate filter 12. The gas stream exiting the engine 15 contains a first $NO_x$ concentration at location 2 before entering oxidation catalyst 11, a second $NO_x$ concentration at location 4 between the oxidation catalyst 11 and the particulate filter 12, a third NOx concentration at location 6 after passing through the particulate filter 12 and entering the optional downstream substrate 13, and a final $NO_x$ concentration at location 8 after passing through the optional downstream substrate 13.

In the oxidation catalyst 11, unburned gaseous and non-volatile hydrocarbons (i.e., the VOF) and carbon monoxide are largely combusted to form carbon dioxide and water. Removal of substantial proportions of the VOF using the oxidation catalyst, in particular, helps prevent too great a deposition of particulate matter on the particulate filter 12 (i.e., clogging), which is positioned downstream in the system. In addition, a substantial proportion of the NO of the $NO_x$ component is oxidized to $NO_2$ in the oxidation catalyst. The increased proportion of $NO_2$ in the $NO_x$ due to the catalytic action of the upstream oxidation catalyst facilitates the reduction of the $NO_x$ as compared to exhaust streams containing smaller proportions of $NO_2$ in the $NO_x$ component.

SCR Catalyst

Suitable SCR catalyst compositions for use in the system are able to effectively catalyze the reduction of the $NO_x$ component at temperatures below 300° C., so that adequate $NO_x$ levels can be treated even under conditions of low load which typically are associated with lower exhaust temperatures. Preferably, the catalytic article is capable of converting at least 50% of the $NO_x$ component to $N_2$, depending on the amount of reductant added to the system. In addition, SCR catalyst compositions for use in the system are also ideally able to aid in the regeneration of the filter by lowering the temperature at which the soot fraction of the particulate matter is combusted. Another desirable attribute for the composition is that it possesses the ability to catalyze the reaction of $O_2$ with any excess $NH_3$ to $N_2$ and $H_2O$, so that $NH_3$ is not emitted to the atmosphere. In certain embodiments of the system, the first SCR catalyst and/or the second SCR catalyst can comprise a Cu containing zeolite having a CHA structure, a mixed oxide of $V_2O_5$, $WO_3$ and $TiO_2$, or a Fe doped zeolite. In one or more embodiments, the SCR catalyst includes a molecular sieve, which may contain a promoter such as Cu, Fe, Mn, Co, Ag and combinations of these materials.

In one or more embodiments, more than one SCR catalyst may be utilized. For example, the optional downstream substrate 13 may include an SCR catalyst, or an additional component (not shown) can be included. The compositions of the SCR catalysts can be identical or different. If they are different, the one SCR catalyst may be operable for $NO_x$ conversion at higher gas stream temperatures and other SCR catalyst may be operable for $NO_x$ conversion at lower gas stream temperatures. For example, one SCR catalyst may include a zeolite having a CHA structure and the other SCR catalyst may include a mixed oxide of $V_2O_5$, $WO_3$ and $TiO_2$. In a specific embodiment, one SCR catalyst may include a Fe doped zeolite and the other SCR catalyst may include a mixed oxide of $V_2O_5$, $WO_3$ and $TiO_2$. In more specific embodiment, one SCR catalyst may include a Fe doped zeolite and the other SCR catalyst includes a zeolite having a CHA structure.

Useful SCR catalyst compositions used in the inventive system also have thermal resistance to temperatures greater than 650° C. Such high temperatures are often encountered during the regeneration of particulate filters. SCR catalyst compositions should also resist degradation upon exposure to sulfur components, which are often present in diesel exhaust gas compositions. The first SCR catalyst is chosen to provide a system $NO_x$ conversion of at least about 10% at 250° C. and a space velocity of about 40,000 $h^{-1}$. Preferably, the first SCR catalyst is chosen to provide a system $NO_x$ conversion of at least about 50% under these same conditions.

Suitable SCR catalyst compositions are described, for instance, in U.S. Pat. Nos. 4,961,917 (the '917 patent) and 5,516,497, which are both hereby incorporated by reference in their entirety. Compositions disclosed in the '917 patent include one or both of an iron and a copper promoter present in a zeolite in an amount of from about 0.1 to 30 percent by weight, preferably from about 1 to 5 percent by weight, of the total weight of promoter plus zeolite. In addition to their ability to catalyze the reduction of $NO_x$ with $NH_3$ to $N_2$, the disclosed compositions can also promote the oxidation of excess $NH_3$ with $O_2$, especially for those compositions having higher promoter concentrations.

When deposited on the particulate filter substrates, such SCR catalyst compositions are deposited at concentrations greater than about 0.1 g/in³ and less than about 3.5 g/in³ to ensure that the desired $NO_x$ reduction and particulate removal levels are achieved and to secure adequate durability of the catalyst over extended use.

Zeolites and molecular sieves used in such compositions are resistant to sulfur poisoning, sustain a high level of activity for the SCR process, and are capable of oxidation of excess ammonia with oxygen. These zeolites have pore size large enough to permit adequate movement of the reactant molecules NO and $NH_3$ into, and the product molecules $N_2$ and $H_2O$ out of, the pore system in the presence of sulfur oxide molecules resulting from short term sulfur poisoning, and/or sulfate deposits resulting from long term sulfur poisoning. The pore system of suitable size is interconnected in all three crystallographic dimensions. As is well known to the those skilled in the zeolite art, the crystalline structure of zeolites exhibits a complex pore structure having more or less regularly recurring connections, intersections and the like. Pores having a particular characteristic, such as a given dimension diameter or cross-sectional configuration, are said to be one dimensional if those pores do not intersect with other like pores. If the pores intersect only within a given plane with other like pores, the pores of that characteristic are said to be interconnected in two (crystallographic) dimensions. If the pores intersect with other like pores lying both in the same plane and in other planes, such like pores are said to be interconnected in three dimensions, i.e., to be "three dimensional". According to one or more embodiments, zeolites which are highly resistant to sulfate poisoning and provide good activity for both the SCR process and the oxidation of ammonia with oxygen, and which retain good activity even when subject to high temperatures, hydrothermal conditions and sulfate poisons, are zeolites which have pores which exhibit a pore diameter of at least about 7 Angstroms and are interconnected in three dimensions. Without wishing to be bound by any specific theory, it is believed that the interconnection of pores of at least 7 Angstroms diameter in three dimensions provides for good mobility of sulfate molecules throughout the zeolite structure, thereby permitting the sulfate molecules to be released from the catalyst to free a large number of the available adsorbent sites for reactant $NO_x$ and $NH_3$ molecules and reactant $NH_3$ and $O_2$ molecules. Any zeolites meeting the foregoing criteria are suitable for use in the practices of the present invention; specific zeolites which meet these criteria are USY, Beta and ZSM-20. Other molecular sieves may also satisfy the aforementioned criteria.

Substrates

Wall flow substrates useful for supporting the SCR catalyst compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 400 or more flow passages (or "cells") per square inch of cross section, although far fewer may be used. For example, the carrier may have from about 100 to 400, more usually from about 200 to 300, cells per square inch ("cpsi"). The cells can have cross sections that are rectangular, square, circular, oval, or are of other polygonal shapes. Wall flow substrates typically have a wall thickness between 0.01 and 0.1 inches. Preferred wall flow substrates have a wall thickness of between 0.012 and 0.015 inches.

Suitable wall flow filter substrates may be composed of ceramic-like materials such as cordierite, α-alumina, silicon carbide, silicon nitride, zirconia, mullite, spodumene, alumina-silica-magnesia or zirconium silicate, or of porous, refractory metal. Wall flow substrates may also be formed of ceramic fiber composite materials. Preferred wall flow substrates are formed from cordierite and silicon carbide. Such materials are able to withstand the environment, particularly high temperatures, encountered in treating the exhaust streams.

Suitable wall flow substrates for use in the inventive system include, but are not limited to, thin porous walled honeycombs (monoliths) through which the fluid stream passes without causing too great an increase in back pressure or pressure across the article. Normally, the presence of a clean wall flow article will create a back pressure of 1 inch water column to 10 psig. Ceramic wall flow substrates used in the system are preferably formed of a material having a porosity of at least 50% (e.g., from 50 to 75%) having a mean pore size of at least 5 microns (e.g., from 5 to 30 microns). More preferably, the substrates have a porosity of at least 55% and have a mean pore size of at least 10 microns. When substrates with these porosities and these mean pore sizes are coated with the techniques described below, adequate levels of SCR catalyst compositions can be loaded onto the substrates to achieve excellent $NO_x$ conversion efficiency. These substrates are still able to retain adequate exhaust flow characteristics, i.e., acceptable back pressures, despite the SCR catalyst loading. U.S. Pat. No. 4,329,162 is herein incorporated by reference with respect to the disclosure of suitable wall flow substrates.

Typical wall flow filters in commercial use are typically formed with lower wall porosities, e.g., from about 35% to 50%, than the wall flow filters utilized in the invention. In general, the pore size distribution of commercial wall flow filters is typically very broad with a mean pore size smaller than 20 microns.

The porous wall flow filter used in this invention is catalyzed in that the wall of said element has thereon or contained therein one or more catalytic materials. This invention includes the use of one or more layers of catalytic materials and combinations of one or more layers of catalytic materials in the walls of the element.

Oxidation Catalyst

The oxidation catalyst 11 can be formed from any composition that provides effective combustion of unburned gaseous and non-volatile hydrocarbons (i.e., the VOF) and carbon monoxide. In addition, the oxidation catalyst should be effective to convert a substantial proportion of the NO of the $NO_x$ component to $NO_2$. As used herein, the term "substantial conversion of NO of the $NO_x$ component to $NO_2$" means a conversion of NO and $NO_2$ to $N_2$ of at least about 5% or at least about 10% or at least about 20%, and specifically of at least about 30% and more specifically of at least 60% over the driving cycle. Catalyst compositions having these properties are known in the art, and include platinum group metal- and base metal-based compositions. The catalyst compositions can be coated onto honeycomb flow-through monolith substrates formed of refractory metallic or ceramic (e.g., cordierite) materials. Alternatively, oxidation catalysts may be formed on to metallic or ceramic foam substrates which are well-known in the art. These oxidation catalysts, by virtue of the substrate on which they are coated (e.g., open cell ceramic foam), and/or by virtue of their intrinsic oxidation catalytic activity provide some level of particulate removal. The oxidation catalyst of detailed embodiments removes some of the particulate matter from the exhaust stream upstream of the filter, since the reduction in the particulate mass on the filter potentially extends the time before forced regenerations.

Upstream of the reductant dosage system is an oxidation catalyst (or DOC). The oxidation catalyst can be formed from any composition that provides effective combustion of unburned gaseous and non-volatile hydrocarbons (i.e., the VOF) and carbon monoxide. In addition, the oxidation catalyst should be effective to convert a substantial proportion of the NO of the $NO_x$ component to $NO_2$. As used herein, the term "substantial conversion of NO of the $NO_x$ component to $NO_2$" means at least 20%, and preferably between 30 and 60%. Catalyst compositions having these properties are known in the art, and include platinum group metal- and base metal-based compositions. The catalyst compositions can be coated onto honeycomb flow-through monolith substrates formed of refractory metallic or ceramic (e.g., cordierite) materials. Alternatively, oxidation catalysts may be formed on to metallic or ceramic foam substrates which are well-known in the art. These oxidation catalysts, by virtue of the substrate on which they are coated (e.g., open cell ceramic foam), and/or by virtue of their intrinsic oxidation catalytic activity provide some level of particulate removal. In detailed embodiments, the oxidation catalyst removes some of the particulate matter from the exhaust stream upstream of the wall flow filter, since the reduction in the particulate mass on the filter potentially extends the time before forced regenerations.

In a specific embodiments, an oxidation catalyst composition that may be used in the emission treatment system contains a platinum group component (e.g., platinum, palladium or rhodium components) dispersed on a high surface area, refractory oxide support (e.g., γ-alumina) which is combined with a zeolite component (e.g., a beta zeolite). In a detailed embodiment the platinum group metal component is platinum. When the composition is disposed on a refractory oxide substrate, e.g., a flow through honeycomb substrate, the concentration of platinum is typically from about 10 to 120 g/ft$^3$ of platinum.

Platinum group metal-based compositions suitable for use in forming the oxidation catalyst are also described in U.S. Pat. No. 5,100,632 (the '632 patent) hereby incorporated by reference. The '632 patent describes compositions that have a mixture of platinum, palladium, rhodium, and ruthenium and an alkaline earth metal oxide such as magnesium oxide, calcium oxide, strontium oxide, or barium oxide with an atomic ratio between the platinum group metal and the alkaline earth metal of about 1:250 to about 1:1, and preferably about 1:60 to about 1:6.

Catalyst compositions suitable for the oxidation catalyst may also be formed using base metals as catalytic agents. For example, U.S. Pat. No. 5,491,120 (the disclosure of which is hereby incorporated by reference) discloses oxidation catalyst compositions that include a catalytic material having a BET surface area of at least about 10 m$^2$/g and consist essentially of a bulk second metal oxide which may be one or more of titania, zirconia, ceria-zirconia, silica, alumina-silica, and α-alumina.

Also useful are the catalyst compositions disclosed in U.S. Pat. No. 5,462,907 (the '907 patent, the disclosure of which is hereby incorporated by reference). The '907 patent teaches compositions that include a catalytic material containing ceria and alumina each having a surface area of at least about 10 m$^2$/g, for example, ceria and activated alumina in a weight ratio of from about 1.5:1 to 1:1.5. Optionally, platinum may be included in the compositions described in the '907 patent in amounts effective to promote gas phase oxidation of CO and unburned hydrocarbons but which are limited to preclude excessive oxidation of SO to $SO_2$. Alternatively, palladium in any desired amount may be included in the catalytic material.

Reductant Injector

A reductant dosing system is provided upstream of the soot filter and downstream of the oxidation catalyst to inject a $NO_x$ reductant into the exhaust stream. As disclosed in U.S. Pat. No. 4,963,332, $NO_x$ upstream and downstream of the catalytic converter can be sensed, and a pulsed dosing valve can be controlled by the upstream and downstream signals. In alternative configurations, the systems disclosed in U.S. Pat. No. 5,522,218, where the pulse width of the reductant injector is controlled from maps of exhaust gas temperature and engine operating conditions such as engine rpm, transmission gear and engine speed. Reference is also made to the discussion of reductant pulse metering systems in U.S. Pat. No. 6,415,602, the discussion of which is hereby incorporated by reference.

Figure 5:
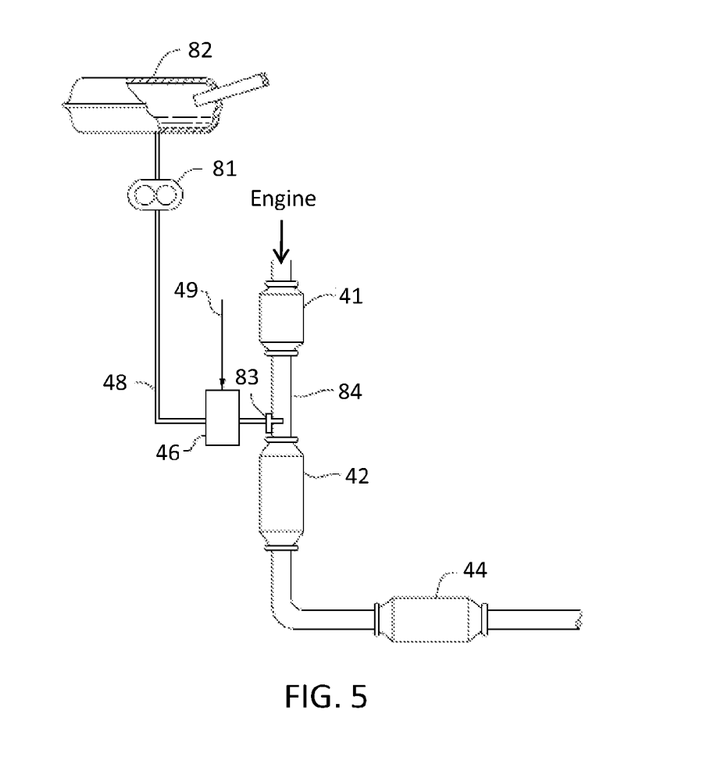
FIG. 5 shows an embodiment of the emission treatment system of the invention that includes a urea reservoir and injector.

In the embodiment of FIG. 5, an aqueous urea reservoir 82 stores a urea/water solution aboard the vehicle which is pumped through a pump 81 including a filter and pressure regulator to a urea injector 46. Urea injector 46 is a mixing chamber which receives pressure regulated air on line 49 which is pulsed by a control valve to urea injector 46. An atomized urea/water/air solution results which is pulse injected through a nozzle 83 into exhaust pipe 84 upstream of the integrated SCR catalyst coated soot filter 42 and downstream of the oxidation catalyst 41. An optional substrate 44 is shown downstream of the SCR catalyst coated soot filter 42.

This invention is not limited to the aqueous urea metering arrangement shown in FIG. 5. It is contemplated that a gaseous nitrogen based reagent will be utilized. For example, a urea or cyanuric acid prill injector can meter solid pellets of urea to a chamber heated by the exhaust gas to gasify the solid reductant (sublimation temperature range of about 300 to 400° C.). Cyanuric acid will gasify to isocyanic acid (HNCO) and urea will gasify to ammonia and HNCO. With either reductant, a hydrolysis catalyst can be provided in the chamber and a slip stream of the exhaust gas metered into the chamber (the exhaust gas contains sufficient water vapor) to hydrolyze (temperatures of about 150 to 350° C.) HNCO to produce ammonia.

In addition to urea and cyanuric acid, other nitrogen based reducing reagents or reductants especially suitable for use in the control system of the present invention includes ammelide, ammeline, ammonium cyanate, biuret, cyanuric acid, ammonium carbamate, melamine, tricyanourea, and mixtures of any number of these. However, the invention in a broader sense is not limited to nitrogen based reductants but can include any reductant containing hydrocarbons such as distillate fuels including alcohols, ethers, organo-nitro compounds and the like (e.g., methanol, ethanol, diethyl ether, etc.) and various amines and their salts (especially their carbonates), including guanidine, methyl amine carbonate, hexamethylamine, etc.

Figure 6:
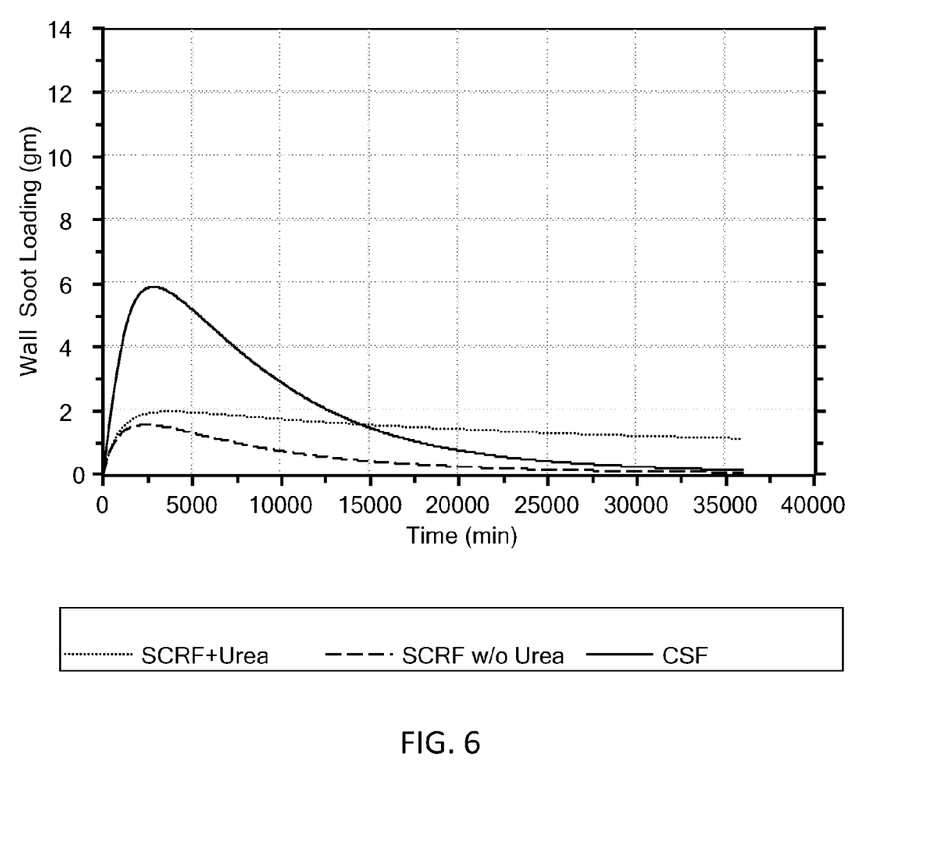
FIG. 6 shows a graph of the cake soot and wall soot loadings as a function of time for SCR catalysts.

FIG. 6 shows a graph of the calculated wall soot loading as a function of time in an SCR catalyst disposed on a filter, where the SCR catalyst uniformly disposed across the wall. The data presented is theoretically derived based on calculations of a copper CHA coated filter component run with and without urea injection and compared to a standard CSF. The calculation represents a situation where NO2 and soot are entering the filter at the same time. What is clearly seen is that although there is a higher initial soot loading in the CSF case (solid line), the soot in the wall is quickly removed by the action of the NO2 oxidation. In the case of an SCR loaded filter without any urea injection, (dashed line) the soot loading is less in the wall and then is removed by $NO_2$ so that it ends up at the same level as the CSF case. In the case of the SCR loaded filter with Urea turned on (dotted line), it is clear that the competition of the SCR reaction with the soot oxidation reaction leaves a significantly higher amount of soot in the wall at the end of the calculated time period. Thus, this calculation illustrates the removal of $NO_2$ in the urea SCR reaction has a negative impact on the amount of soot built up in the wall of the filter and thus the amount of backpressure as well as the frequency of regeneration.

While this invention has been described with an emphasis upon an assortment of embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. A catalytic article comprising a wall flow filter having a plurality of longitudinally extending passages formed by longitudinally extending porous walls having substantially uniform porosity in cross-section bounding and defining the passages wherein the passages comprise inlet passages having an open inlet end and a closed outlet end, and outlet passages having a closed inlet end and an open outlet end, each of the porous walls having in cross-section an inlet portion and an outlet portion, the outlet portion being no greater than about 60% of the cross-sectional thickness of the porous walls, and the wall flow filter loaded with an SCR catalyst composition such that substantially all of the catalyst is distributed in the outlet portion of the porous walls.

2. The catalytic article of claim 1, wherein the SCR catalyst uniformly permeates the outlet portion of the porous walls.

3. The catalytic article of claim 1, wherein the inlet portion of the wall is substantially free of SCR catalyst composition.

4. The catalytic article of claim 3, wherein the article is effective to allow soot trapped in the inlet portion of the wall to react with $NO_2$ and to combust the soot.

5. The catalytic article of claim 1, wherein the wall flow filter has a mean pore size in the range of about 3 and about 35 μm.

6. The catalyst of claim 1, wherein the outlet portion of the porous walls is no greater than about 50% of the cross-section of the porous walls.

7. The catalyst of claim 1, wherein the outlet portion of the porous walls is no greater than about 40% of the cross-section of the porous walls.

8. A method of treating an exhaust gas stream including NOx and soot, the method comprising passing the exhaust gas stream through the catalytic article of claim 1.

9. The method of claim 8, wherein the exhaust gas entering the catalyst composition has a $NO_2$ percentage greater than about 50% of the total $NO_x$ composition.

10. The method of claim 8, wherein the outlet portion of the porous walls is no greater than about 50% of the cross-section of the porous walls.

11. The method of claim 8, wherein the outlet portion of the porous walls is no greater than about 40% of the cross-section of the porous walls.

12. The method of claim 8, wherein the catalytic article is effective to form a soot cake on the inlet surface of the porous walls.

13. A system for treating exhaust from a diesel engine comprising the catalytic article of claim 1 located downstream of the engine.

14. The system of claim 13, further comprising a urea injector located upstream of the catalytic article.

15. The system of claim 13, further comprising one or more of a diesel oxidation catalyst, a particulate filter, a reductant injector and an air injector.

* * * * *